(12) United States Patent
Ekberg (10) Patent No.: US 10,776,474 B2
(45) Date of Patent: Sep. 15, 2020

(54) TOKEN EXECUTION SYSTEM FOR ACCESS CONTROL

(71) Applicant: Bitwards Oy, Espoo (FI)

(72) Inventor: Jan-Erik Ekberg, Espoo (FI)

(73) Assignee: Bitwards Oy, Espoo (FI)

( * ) Notice: Subject to any disclaimer, the term of this patent is extended or adjusted under 35 U.S.C. 154(b) by 232 days.

(21) Appl. No.: 16/128,546

(22) Filed: Sep. 12, 2018

(65) Prior Publication Data

US 2019/0080075 A1 Mar. 14, 2019

(30) Foreign Application Priority Data

Sep. 12, 2017 (EP) ................................ 17190592

(51) Int. Cl.
| | | |
|---|---|---|
| *G06F 21/34* | (2013.01) | |
| *H04L 29/06* | (2006.01) | |
| *G06F 21/62* | (2013.01) | |
| *H04L 9/08* | (2006.01) | |
| *H04L 9/32* | (2006.01) | |
| *G06F 21/33* | (2013.01) | |
| *H04W 12/00* | (2009.01) | |
| *H04W 12/06* | (2009.01) | |

(52) U.S. Cl.
CPC ............ *G06F 21/34* (2013.01); *G06F 21/335* (2013.01); *G06F 21/62* (2013.01); *H04L 9/0891* (2013.01); *H04L 9/3213* (2013.01); *H04L 9/3234* (2013.01); *H04L 9/3271* (2013.01); *H04L 63/0807* (2013.01); *H04L 63/10* (2013.01); *H04W 12/0023* (2019.01); *H04W 12/06* (2013.01)

(58) Field of Classification Search
CPC ...................................................... G06F 21/34
See application file for complete search history.

(56) References Cited

U.S. PATENT DOCUMENTS

| | | | | |
|---|---|---|---|---|
| 5,956,404 A | * | 9/1999 | Schneier ............... | G06Q 20/401 380/30 |
| 6,578,090 B1 | * | 6/2003 | Motoyama ............ | G06F 9/4488 719/315 |
| 10,230,693 B2 | * | 3/2019 | Dawson ............... | H04L 63/0428 |
| 10,356,128 B1 | * | 7/2019 | Lango ..................... | H04L 67/10 |
| 2003/0177101 A1 | * | 9/2003 | Ferris ................... | G06Q 20/367 705/65 |
| 2009/0259838 A1 | * | 10/2009 | Lin ....................... | H04L 9/3226 713/150 |
| 2013/0312091 A1 | * | 11/2013 | Merchant ............ | H04L 63/0853 726/20 |

(Continued)

FOREIGN PATENT DOCUMENTS

| | | |
|---|---|---|
| WO | WO2016172119 A1 | 10/2016 |
| WO | WO2017093597 A1 | 6/2017 |

*Primary Examiner* — Bradley W Holder (74) *Attorney, Agent, or Firm* — Laine IP Oy (57) ABSTRACT

According to an example aspect of the present invention, there is provided an apparatus comprising: a memory configured to store a user key specific to a particular user or token; software code; a token relating to a second apparatus, the token comprising the user key and the software code, and at least one processing core configured to: participate in an interaction with the second apparatus, the interaction being based at least partly on the token and the user key and the interaction comprising transmitting the token to the second apparatus.

14 Claims, 6 Drawing Sheets

Storing a user key specific to a particular user or token, software code and a token relating to a second apparatus, the token comprising the user key and the software code.   510

Participating in an interaction with the second apparatus, the interaction being based at least partly on the token and the user key and the interaction comprising transmitting the token to the second apparatus.   520

(56) References Cited

U.S. PATENT DOCUMENTS

| | | | | |
|---|---|---|---|---|
| 2014/0365781 A1* | 12/2014 | Dmitrienko | ............. | G06F 21/34 |
| | | | | 713/185 |
| 2015/0143508 A1* | 5/2015 | Halibard | ............... | G06F 9/4406 |
| | | | | 726/18 |
| 2016/0379428 A1* | 12/2016 | Ahearn | .................... | G07C 9/28 |
| | | | | 340/5.61 |
| 2019/0205150 A1* | 7/2019 | Srinivasan | .............. | G06F 9/455 |

* cited by examiner

610 — Participating in an interaction with a user device, the interaction being based at least partly on a token comprising software code and a user key specific to a particular user or token and the interaction comprising receiving executable software code from the user device.

FIGURE 6

TOKEN EXECUTION SYSTEM FOR ACCESS CONTROL

FIELD

The present invention relates to cryptographically secured access to resources, such as, for example, locks, vehicles or delivery boxes.

BACKGROUND

Resources may have value, wherefore they are often sought to be secured against unauthorized access. For example, a warehouse may be locked to prevent theft or sabotage of its contents, cars may be startable only with a suitable access credential, such as a key, such that the cars cannot be easily stolen.

Valuable resources may be utilized by their owners directly, as in the case of a personally owned vehicle, or access to resources may be delegated, for example, where a car rental service operates a fleet of cars, customers may be given keys that unlock and enable starting a specific car. Further, a person may lend his car to a family member, for example, by giving the family member the car keys.

Alternatively to physical keys, access codes may be used in securing access to resources, for example, a safe in a hotel room may be configured with a secret code, which unlocks the door of the safe. Likewise, an email account or encrypted file may be protected with a password or passphrase. Access to such a resource may be delegated by providing a copy of the password or passphrase to the delegate, with the consequence the delegate will have access that is equal to the access of the resource owner.

A yet further alternative is where resources are managed by resource lock devices, which are connected to a central server. Users may be provided with user-specific access dongles, which may comprise user-specific access codes and/or encryption keys. An operator may update the resource lock devices via a network connection between the resource lock devices and the central server, to inform the locks of users that are to be given access, or denied access.

Using the network connection, stolen or lost access dongles may be deactivated to prevent unauthorized persons from gaining access via the lock devices, for example.

SUMMARY OF THE INVENTION

The invention is defined by the features of the independent claims. Some specific embodiments are defined in the dependent claims.

According to a first aspect of the present invention, there is provided an apparatus comprising: a memory configured to store: a user key specific to a particular user or token; software code; a token relating to a second apparatus, the token comprising the user key and the software code, and at least one processing core configured to: participate in an interaction with the second apparatus, the interaction being based at least partly on the token and the user key and the interaction comprising transmitting the token to the second apparatus.

Various embodiments of the first aspect may comprise at least one feature from the following bulleted list:
- the software code is configured to, when run on the second apparatus, at least partly determine behaviour of the second apparatus in connection with the interaction
- the software code is configured to be run in a virtual machine of the second apparatus.
- the software code comprises instructions for controlling behaviour of the second apparatus.
- the software code comprises instructions for controlling behaviour of the virtual machine.
- the token may be delegated by a user to another user.
- the software code comprises less than 20 bytes of data.
- the software code is configured to control the virtual machine, the virtual machine comprising less than 1000 bytes of data.
- the apparatus comprises a smart card.

According to a second aspect of the present invention, there is provided an apparatus comprising: a memory configured to store information, and at least one processing core configured to: participate in an access interaction with a user device, the access interaction being based at least partly on a token and a user key and the access interaction comprising receiving executable software code from the user device.

Various embodiments of the second aspect may comprise at least one feature from the following bulleted list:
- the apparatus is configured to run the software code on the at least one processing core to at least partly determine behaviour of the apparatus in connection with the interaction.
- the apparatus is configured to run the software code on the at least one processing core in a virtual machine run on the at least one processing core.
- the apparatus is configured to re-use the software code in a second access interaction with the user device or a second user device.
- the apparatus is configured to participate in the interaction in an offline state.
- the software code comprises instructions for controlling behaviour of the apparatus.
- the software code comprises instructions for controlling behaviour of a virtual machine.
- the apparatus is configured to accept delegation of the token by a user to another user.
- the software code comprises less than 20 bytes of data.
- the software code is configured to control the virtual machine, the virtual machine comprising less than 1000 bytes of data According to a third aspect of the present invention, there is provided a method in an apparatus, comprising: storing a user key specific to a particular user or token, software code, and a token relating to a second apparatus, the token comprising the user key and the software code, participating in an interaction with the second apparatus, the interaction being based at least partly on the token and the user key and the interaction comprising transmitting the token to the second apparatus.

Various embodiments of the third aspect may comprise at least one feature corresponding to a feature from the preceding bulleted list laid out in connection with the first aspect.

According to a fourth aspect of the present invention, there is provided a method in an apparatus, comprising: participating in an interaction with a user device, the interaction being based at least partly on a token comprising software code and a user key specific to a particular user or token and the interaction comprising receiving the software code from the user device.

Various embodiments of the fourth aspect may comprise at least one feature corresponding to a feature from the preceding bulleted list laid out in connection with the second aspect.

According to a fifth aspect of the present invention, there is provided a non-transitory computer readable medium having stored thereon a set of computer readable instructions that, when executed by at least one processor, cause an apparatus to at least store a user key specific to a particular user or token, software code, and a token relating to a second apparatus, the token comprising the user key and the software code, and participate in an interaction with the second apparatus, the interaction being based at least partly on the token and the user key and the interaction comprising transmitting the token to the second apparatus.

According to a sixth aspect of the present invention, there is provided a non-transitory computer readable medium having stored thereon a set of computer readable instructions that, when executed by at least one processor, cause an apparatus to at least participate in an interaction with a user device, the interaction being based at least partly on a token comprising software code and a user key specific to a particular user or token and the interaction comprising receiving the software code from the user device.

EMBODIMENTS

Described herein is a token-based system enabling offline access to a resource, wherein by offline it is meant that during an interaction, such as an access interaction with the resource, neither the resource nor the accessing device need a connection to any further node, such as, for example a server. Expressed in other words, the offline interaction is performed between two entities only, the resource and the user device. Further, token-based delegation of access rights is herein described in the context of the offline access system. The delegation may be based on a hash tree structure, for example.

Figure 1:
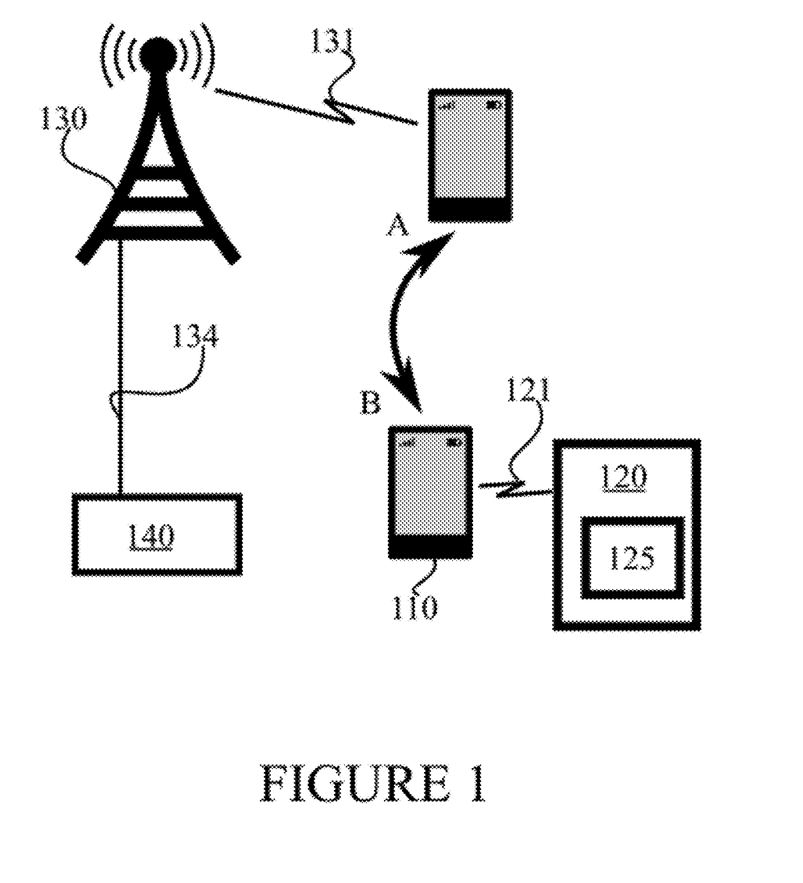
FIG. 1 illustrates an example system in accordance with at least some embodiments of the present invention.

FIG. 1 illustrates a system in accordance with at least some embodiments of the present invention. Comprised in the system is user device 110, which may comprise, for example, a mobile phone, a smartphone, a tablet device, a smart watch, an item of smart jewellery or indeed another type of suitable electronic device. User device 110 will herein be referred to as device 110 for the sake of brevity. Further comprised in the illustrated system is resource or apparatus 120. Resource or apparatus 120 may comprise an electronic lock, an electronic lock controller, a vehicle, a postal locker locking device, a shareable utensil, tool, an access regulation device, a shared resource, a bank account or a computer or a smart card or smart key fob, for example. Resource 120 may be battery-powered, for example. Resource 120 comprises virtual machine 125. Virtual machine 125 is stored on an electronic medium connected to or within resource 120. Virtual machine 125 may be stored on a non-transitory electronic medium, such as RAM or ROM. In some embodiments in accordance with the present invention, several resources may utilize a common virtual machine. In some embodiments, a single resource may control a plurality of physical objects or devices or, alternatively or additionally, a single resource may control a multitude of states for a physical object or access control need. Device 110 may be moved between schematically illustrated positions A and B in accordance with the two-pointed bent arrow.

Device 110 is enabled to communicate with server 140 when in position A. In the example of FIG. 1, device 110 can communicate with server 140 via cellular link 131, base station 130 and network connection 134. Connection 134 may traverse one or more than one network. Alternatively to a cellular connection, a non-cellular connection may be employed. Examples of cellular technologies include long term evolution, LTE, and wideband code division multiple access, WCDMA. Examples of non-cellular technologies include wireless local area network, WLAN, and worldwide interoperability for microwave access, WiMAX. Where a non-cellular technology is used, base station 130 may be referred to as an access point rather than a base station, for example. In some embodiments, the connection toward server 140 from device 110 is not wireless, but wire-line.

Further, server 140 may be configured to provide to device 110, and/or other user devices, management data that relates to resources to be managed. For example, management data may comprise information of users or tokens that are to be blacklisted and prevented from accessing the resource in question, and/or the management data may comprise other information, such as additional constraints concerning access. Additional constraints may comprise, for example, that a certain token or user, or all tokens or users, can only access the resource at certain times of day. Constraint data may be present in tokens as well. Where constraint data is present in both a token and in management data, an access may need to satisfy all the constraints, in the token and in the management data, to proceed.

Device 110 and resource 120 are arranged to communicate with each other via link 121 when device 110 is in position B. Link 121 may comprise a suitable short-range communication interface, such as near-field communication, NFC, or Bluetooth for example. When a user wants to access resource 120, for example to pass through a door locked by resource 120, he may present device 110 for an interaction with resource 120. The interaction may be an access interaction. The interaction may be conducted over link 121. While device 110 may be capable of communicating with base station 130 also in position B, device 110 need not, in at least some embodiments, communicate with base station 130 when interacting with resource 120 to obtain the benefits of the present invention.

When the user seeks to access resource 120, he may move device 110 to within communication range of link 121, for example to position B of FIG. 1, or otherwise trigger the interaction with resource 120. The interaction may take place over link 121, for example. In the interaction may be comprised two phases, an optional management phase and an access phase. The management phase, where present, may precede the access phase. In the management phase, device 110 provides any management data intended for resource 120 it may have received from server 140. An authentication may precede the management phase, the authentication being based on a challenge-and-response process, for example. The challenge may be based on cryptographic information device 110 has, such as a token, for example. In some use cases, resource 120 may agree to participate in an management phase with device 110 even if, ultimately, the access phase leads to a conclusion that device 110 is denied access. Thus resource 120 may receive management data even from devices that do not get access.

An advantage of forcing the management phase to precede the access phase is obtained in avoiding a situation where user devices would discontinue the interaction after being granted access to the resource in the access phase of the interaction. The user might prefer to interrupt the interaction after gaining access and before the management phase to save time or battery resources on device 110, for example. In an offline system, resource 120 may only be able to receive management data via management phases of interactions, wherefore completing the management phase before the access phase ensures resources of the system remain in indirect contact with server 140.

Management data may be secured with the resource key, for example it may be encrypted and/or signed, to prevent device 110 from knowing the contents of the management data and to prevent device 110 from being able to modify the management data undetectably. In some embodiments, where resource 120, after the access interaction, realizes the management data was corrupt, resource 120 will thereafter refuse access to the user device that provided the corrupted management data. Resource 120 may realize the management data is corrupt by determining a cryptographic signature on the management data is invalid, for example. Resource 120 may thereafter provide an indication of this toward server 140 in a management phase of a subsequent access interaction, for example with a different user device. This different user device may forward the indication toward server 140 later, when this user device is again in contact with server 140.

In the access phase of the interaction, device 110 may initially provide the token to resource 120. Resource 120, being in possession of the resource key used to encrypt the token by server 140, will decrypt the token to access the user key therein, and proceeds to issue a challenge to device 110. The challenge may take the form of a nonce, for example, which device 110 may sign using the user key, and provide the signed nonce to resource 120 for verification. Signing may comprise use of a hash-based message authentication code, HMAC, process, for example. Resource 120 may use its copy of the user key to verify the signature, and thus verify device 110 is in also possession of the user key. Alternatively, the challenge may comprise resource 120 generating a random value and encrypting it with the user key, providing the encrypted random value to device 110, and then verifying that device 110 provides back to resource 120 a correctly decrypted random value. As a yet further alternative, the challenge may comprise resource 120 generating a random value and providing it to device 120, which will encrypt it with the user key, and resource 120 subsequently decrypts the encrypted random value to check, that the original random value is obtained. In general, the challenge is used by resource 120 to verify device 110 has the user key. The user key may be provisioned in a user-specific or token-specific way, to thereby ensure the key is specific to a user or token.

In case the token comprises constraints relating to access of device 110 to the resource, resource 120 may verify that the constraints are complied with. As any such constraints are comprised in the encrypted token device 110 is not capable of decrypting, the user cannot remove constraints relating to his access to the resource. Constraints may relate to a time of day or a day of week, for example. For example, an employee may have only work-week access to a factory during office hours. Access attempts at other times may be refused and/or logged by resource 120.

Since the interaction is based on token and challenge exchange, it does not need a live connection to server 140 at the time it is conducted. Likewise, where management data is provided, the management data may be pre-downloaded from the server, wherefore the management phase of the access interaction also does not require a live connection to server 140, resulting overall in an offline token-based access scheme.

In some embodiments of the present disclosure, the token comprises software code. The software code may comprise executable software code and/or source code. Executable software code may comprise, for example, a computer program, function or executable program module. Upon receipt and decryption of the token, the software code may be identified and transmitted internally from the resource 120 to the virtual machine 125. The virtual machine 125 may then execute the code, and, according to logic in the code, communicate the result to the resource 120. In some embodiments, the virtual machine 125 is instantiated or booted when the resource 120 receives the software code. In some embodiments, the software code comprises logical instructions regarding the behaviour of the resource, logical instructions altering the behaviour of the virtual machine, et cetera. In some embodiments in accordance with the present disclosure, the behaviour of the resource is understood to mean altering the present or future state of the outputs of the resource or device 120, or, additionally or alternatively, the behaviour may comprise restarting, resetting, reprogramming the resource. In some embodiments the behaviour may comprise logical instructions such as addition, subtraction, toggling outputs, or if-then-else conditional actions. In some embodiments the behaviour may comprise creating, modifying or deleting policies for the resource to act in accordance with.

In at least some embodiments, the software code is used on the resource side in the same interaction as the one where the software code is provided to the resource. Thus, for example, the resource is enabled to interact with a user device in a more versatile way and more diverse policies are possible to be implemented. For example, the resource may be controlled, by the software code, to modify its behaviour for a set period of time, for example two hours.

The resource 120 then acts in accordance with the result. The result may comprise instructions regarding the general operation of the resource, instructions regarding operations to be conducted with respect to a certain token, timed instructions for the resource behaviour in the future, outputting a specific value, variable, voltage or packet to a specific external device connected to the resource, activating or deactivating an analog or digital input or output of the resource (such as a GPIO pin), storing information for later transmission, et cetera. For example, the executable software code may enable determining, based at least partly on the token, whether access is to be granted or no. For example, the executable software code may be arranged to cause provision of a user interface to a user, to receive inputs from the user concerning, for example, preferences of the user. For example, upon receiving the code from the token and executing the code, a door lock may be instructed to allow access to a certain user, but only if another user has accessed the device within the previous hour and it is a certain weekday.

In some embodiments, the user of the device accessing the resource can give input (a wish state for operation) in the transaction where the token (and therefore the code) is used. For example, a token could be allowed to carry out several operations, of which the user selects one. Alternatively or additionally, the same end result could be achieved if the resource itself has a UI, whereby the user's wish state shows up as a "resource state".

Figure 2:
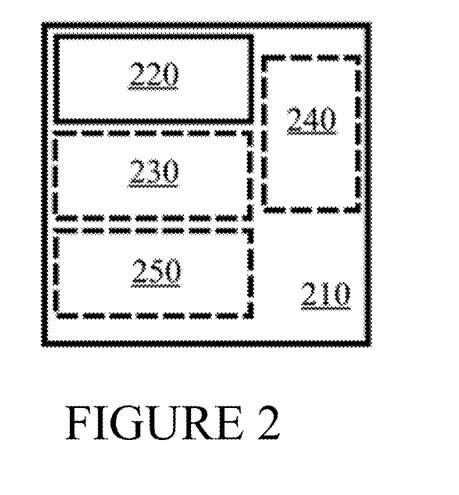
FIG. 2 illustrates a token in accordance with at least some embodiments of the present invention.

FIG. 2 illustrates a token in accordance with at least some embodiments of the present invention. Token 210 comprises therein a user key 220. The token 210 may optionally further comprise constraints 230, the constraints constraining access to be given based on the token, for example, as it relates to when the token may be used to access the resource the token relates to. Token 210 may optionally further comprise a delegation secret 240. The delegation secret and its operation have been described herein above. The token overall may be encrypted with a resource key, that is, a key of resource 120 that user device 110 does not possess. Token 210 may comprise software code 250. The software code may be encrypted and/or integrity protected in the token. Overall, the token and its contents may be encrypted and/or integrity protected.

Figure 3:
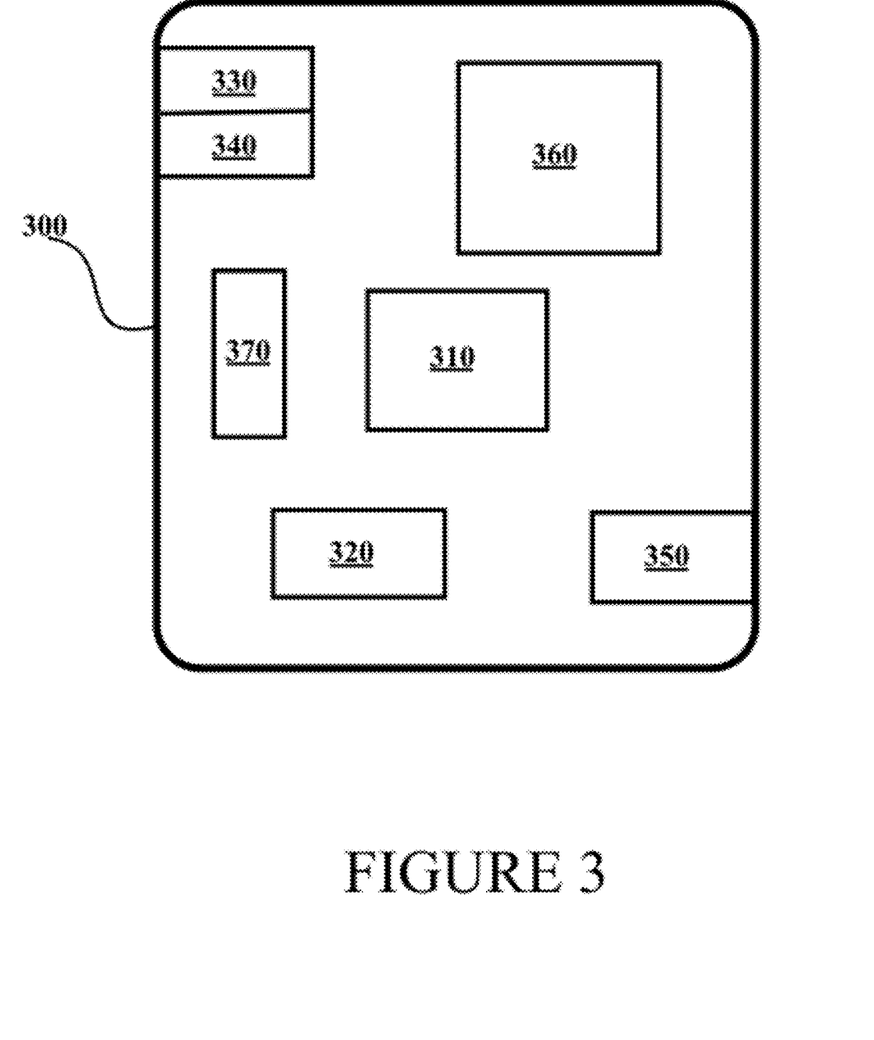
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 or, in suitable parts, resource 120 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to delegate access rights to a delegate.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
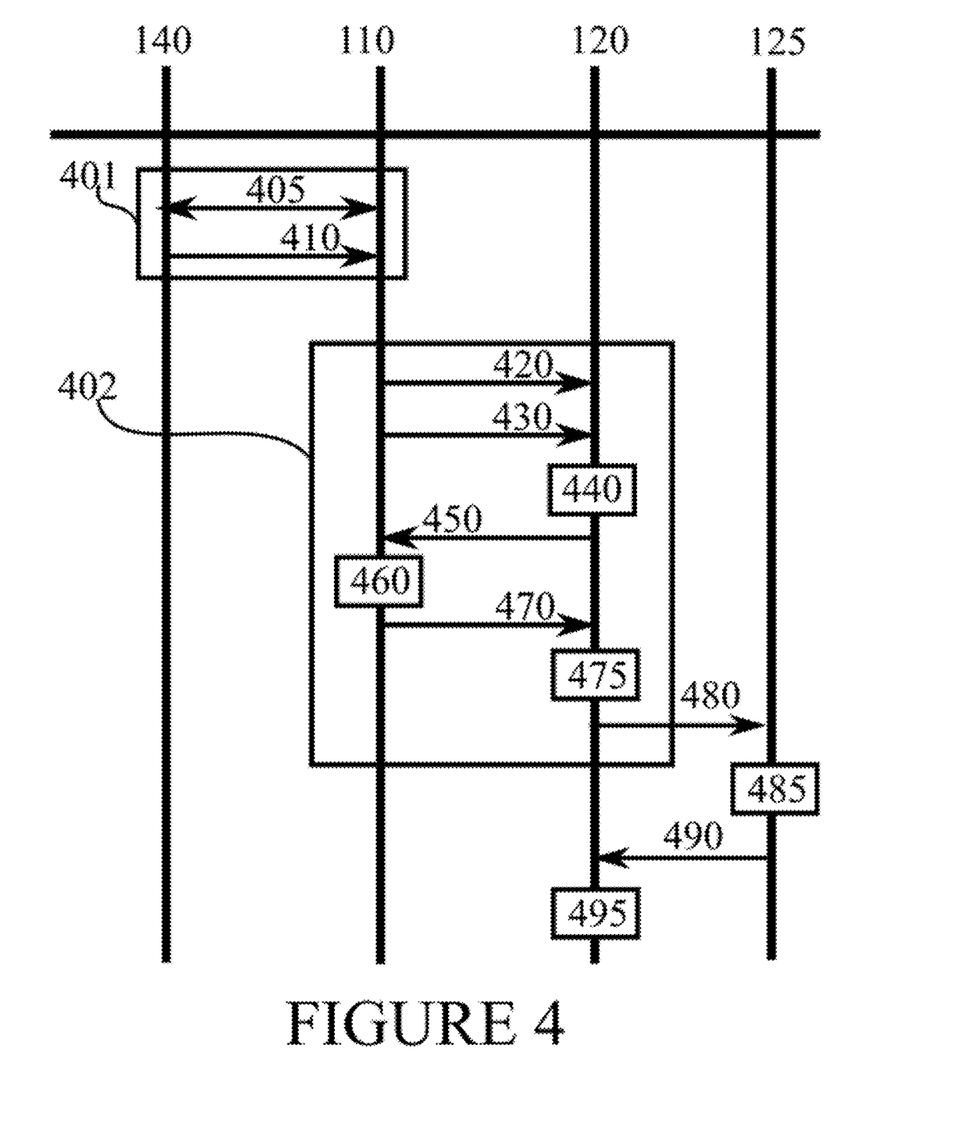
FIG. 4 illustrates signalling in accordance with at least some embodiments of the present invention.

FIG. 4 illustrates signalling in accordance with at least some embodiments of the present invention. On the vertical axes are disposed, on the leftmost axis, server 140, on the second axis from the left, device 110 and on the third axis from the left, resource 120. Virtual machine 125 is disposed on the rightmost axis. Time advances from the top of the graph towards the bottom.

During server interaction 401, device 110 is provisioned by server 140. An optional authentication phase 405 precedes provisioning phase 410, where server 140 provides to device 110 a token, a user key and, optionally, management data for resource 120 and/or a delegation secret. Server interaction 401 may take place over a suitable cellular or non-cellular, wireless or wire-line connection.

Later, an access interaction 402 takes place between device 110 and resource 120. A management phase 420 may precede the access phase, as described above. In management phase 420, device 110 may provide to resource 120 any management data received during server interaction 401.

In phase 430, device 110 provides to resource 120 the token. Resource 120, in phase 440, decrypts the token and prepares a challenge to device 110, which is transmitted from resource 120 to device 110 in phase 450. Responsively, in phase 460, device 110 prepares a response to the challenge, using the user key, and in phase 470 device 110 transmits the response to resource 120, which verifies the response, using the user key obtained from the decrypted token, in phase 475. Where the token comprises constraints, those may also be verified in phase 475, or, optionally, already in phase 440, where applicable.

Where the token comprises executable software code, the resource 120 transmits the executable code to the virtual machine 125, for example in phase 480. The software code may be inside the transferred token, which may be encrypted and/or integrity-protected from server to resource. The software code may have a specific memory area or slot in the token, identified, for example, by a specific type-length-value record. The virtual machine 125 runs the code, in accordance with the principles set out in this disclosure, in phase 485. Optionally, if the result of the code requires action on part of the resource 120, the virtual machine 125 transmits the result or makes the result available to the resource in phase 490. In some embodiments, the Input/Output of the virtual machine may consist of a set of 8 bytes input (coming from separate sources, like the resource itself (state) and possible user input and token specific storage (2 bytes)). It can be understood that the software code sees this input as "memory". In the same manner, the output is the same "memory". When the interpreter completes, the different parts of the 8 byte memory may be interpreted in a resource specific way. For example, 2 bytes may be stored on the resource in conjunction with this specific token ID (to be present in the memory the next time the same token is used in the same resource). Some part of the memory may be copied to resource output, say setting GPIOs or being channeled as a message to another processing unit within, or associated with the resource. The resource then acts on the result in phase 495.

Described in this disclosure is a token-based system enabling offline access to a resource, wherein by offline it is meant that during an interaction with the resource, neither the resource nor the accessing device need a connection to any further node, such as, for example a server. Expressed in other words, the offline interaction is performed between two entities only, the resource and the user device. Further, token-based delegation of access rights is herein described in the context of the offline access system. The delegation may be based on a hash tree structure, for example.

The token-based system described herein is designed to implement physical access control with off-the-shelf mobile devices in a partially offline manner.

Locks, i.e. resources 120 open, if they are presented with tokens 210, constructed by a centralized server, and designated for a specific resource (i.e. encryption and authentication for tokens are provided individually for each resource, based on secrets that are shared between the centralized server and each individual resource.

The users' (i.e. system participants) are provided (by the server) tokens for all resources the user is supposed to have access to. All resources have a (roughly) synchronized understanding of real-time, and tokens for a resource can be limited by constraints 230.

Constraints may become usable (activated) or expire (deactivated) after a certain time has elapsed or based on other properties such as weekday, location, user location history, et cetera. The constraints are part of the token, and since the token is cryptographically authenticated, this information is immutable by the user.

The users or system participants may utilize devices in accordance with devices 100 or 300, mobile phones, tablets, RFID cards, key fobs, smart devices, et cetera.

Additionally, to prevent stealing and/or free sharing of tokens between users, the token (for the specific resource and user) also carries an authentication key for the user (a secret otherwise only known by the server components and a secure environment in the phone). The protocol by which a user submits a token to a resource also includes an authentication step using this secret, and since the token is encrypted for the resource, only the resource will get hold of the authentication key by which the secure environment in the user's device can be authenticated.

Furthermore, the token system allows for token delegation in further embodiments. In this embodiment the token contains a delegation key, also provided to the token owner device. This delegation key can be used to construct one-time-access value authorizations. By the user sharing the token, a delegation index (identifying which one-time token has been derived from the delegation key) and one or several associated one-time-access values, he can provide to a third party limited access to the resource he typically has access to. This feature can be used in the sharing economy where temporary access often needs to be granted, or for other use-cases where e.g. delivery of goods to one's home door may require granting such one-time privileges e.g. to a delivery man.

Granting access to open a door is a highly binary activity, a user has a key (a token, an identity that can be validated), and access is either granted or not granted—the door is either opened or not. Even though this is a very common use case for (physical) access control it is evident that there is a wealth of functional access control requirements that cannot be solved with this "general" mechanism alone. The token system of this disclosure aims to provide a common baseline for a protocol and access control service that can be applied for all types of access requirements, the following list outlines a few simple use cases where in fact the current baseline is not enough:

1. A postbox cabinet solution: A rack of cabinets for cost reasons share a common lock logic/resource, and the cabinet door that is opened is an index that should be (securely) provided to the resource as part of the authorization.
2. A stateful resource: Possibly a resource "opens" at first invocation and "closes" at the second invocation. Or the resource decision to allow access may be dependent on its internal state, say it may require a set of three out of five possible authorizations to be done in sequence to allow entry. Or access may restricted based on state—some tokens are allowed access only when the train is standing still, other may allow access independently of train movement.

3. Complex resource control: Combined with the abovementioned two use cases, the resource itself might require complex commands to trigger. This amounts to servicing an architecture where the access control logic is external to the embedded (access control) service it is driving, and a general-purpose communication interface is needed between the two.

In the token system of the present disclosure, a portion of executable code is added to each token. Conceptually this means that each token carries an executable that defines some piece of logic that the resource will act upon. The executable code is evaluated by an interpreter (i.e. a virtual machine) in each resource (120). The code portion therefore is contained by the token and executed by virtual machine within the resource after the token has been utilized in the interaction described above.

In accordance with some embodiments of the present disclosure, the token may comprise a physical object, a smart card, a RFID card.

In the token system of the present disclosure, the resource may not be connected to a network, as described above. The code execution is not network-dependent, however. Therefore one advantageous technical effect or benefit of the present invention is to allow new or modified functionality to be implemented in resources not presently connected to a wide area network, local network, cellular network et cetera. Furthermore, in some embodiments of the invention, the device transmitting the token to the resource is also not connected to a network at the time of transmission or interaction. Therefore the invention allows secure access of resources and reprogramming resource behaviours in areas or situations where it is not possible to communicate via long-range networks. Additionally, a single resource may, in accordance with certain embodiments of the invention, be able to control multiple devices and, additionally or alternatively, control multiple states of the devices.

In accordance with some embodiments of this disclosure, the behaviour of a resource may be altered on a case-to-case basis via tokens containing differing executable code, without the resource being maintained, updated, physically removed or otherwise specifically reconfigured. Another benefit of the present disclosure is that all resources will interpret the code in the same manner; therefore the token system resource engine (library) will still be harmonized across all devices, even if they are from different manufacturers etc.

In accordance with some embodiments of the invention, logical instructions may be provided within software code. Some of these instructions or the outcomes therein may also be provided by alternate methods, for example whitelisting, blacklisting or setting timers. Using alternate methods to implement complex logical instructions will require large amounts of memory and may also result in unnecessary overhead, i.e. memory resources are used to implement instructions which are not presently needed. These alternate methods may therefore be susceptible to the state space explosion problem. Therefore a benefit of the present invention is providing complex logical instructions to the resource with a low memory footprint or usage.

What may differ between resources is the definition of the inputs provided to the executable, and the interpretation of the results when the code has been executed. The interface to the code on the resource side is a very small I/O memory area, some of which actually is token-specific storage on the device (token local-variables), and some is resource-specific I/O.

The requirements of the solution stem from the embedded nature of the access control solution. Today, tokens are some tens of bytes (and significant enlargement would result in more local communication with the resource, and therefore would show up as access delays). The resource library that implements the token system is only tens of kilobytes in size, and this needs to be portable to low-end microcontrollers where size does matter. Our solution and examples show that the resource interpreter or virtual machine for this solution can fit in 500-600 bytes of code, and that sensible programs (implementing some of the use cases listed above) can be coded in ten bytes of code or less. The small size of the virtual machine and the executable code therefore has a technical benefit of allowing low-end hardware to efficiently operate the virtual machine and also allow faster interactions, including access interactions as the data being transmitted is small, leading to faster transmission time and faster processing time.

The execution environment engine is instantiated in the resource (more specifically the lock logic library) as a general-purpose machine that will help to a) implement policy for tokens (beyond a binary access decision) and b) to implement differing hardware library solutions originating from a common hardware design. In accordance with some embodiments of the present disclosure, the lock logic may contain the complete logic to run the access control protocols, and among other things, may contain the virtual machine. The programs for the engine are located in the token, i.e. tokens may even differ in functionality when successfully presented to a resource. Attached examples show that programs as small as 10 bytes can implement meaningful business cases in the access control framework. The current non-optimized interpreter (written in C) will consume around 800 bytes in compiled form, and can operate within 100 bytes of stack. This is small enough to not be a concern for resource integration.

The virtual machine is a very simple logic engine that supports loop and conditionals, but mostly is intended to do arithmetic operations over a small I/O memory and some N/V memory. The machine has 3 functional registers, and its command width as well as word length is 8 bits. All operations are unsigned, the machine has no notion of negative values.

Registers: The execution environment and virtual machine has 3 registers, A, B and C. To save bits for indexing them, different commands will index these registers differently, and not all commands may source from or write to all registers. The registers have a width of 8 bits.

1. REG A: Arithmetic target register (unconditionally) Register index 0 for arithmetic commands and MOV 2. REG B: Register index 1 for arithmetic commands, and MOV Register index 0 for Load and Store 3. REG C: Register index 2 for arithmetic commands, and MOV Register index 1 for Load and Store Target register for IMMediate stores Commands: The commands are presented as a prefix (of bits) followed by parameters, which individually form parts of the 8-bit command size.

LOAD and STORE

LOADB: 0000 REG LOC

STOB: 0001 REG LOC

These commands read and write information between the registers and the memory which has the size of 8 bytes. The memory is described later in this disclosure. LOAD and STORE can only target registers B and C.
   REG: 1 bit
   LOC: 3 bits
   SET IMMEDIATE
   SETIMM HI: 0010 VAL
   SETIMM LO: 0011 VAL
Values in the code can be written to a register by the set immediate commands. One puts the date nibble in the command into the most significant nibble of the target register, and the other command fills the lower bits.
   VAL: 4 bits
   JUMPS
   JMPF 0100 VAL
   JMPB 0101 VAL
The JUMP command unconditionally jumps forward or backward a designated amount of commands (max 16). When jumping backwards, the target is one beyond the number of commands, i.e. a JMPB 1 is a non-terminating loop (jump to itself). A JMPF 1 leaves the command following the JMP command unexecuted. The engine will not allow jumps outside the provided program.
   VAL: 4 bits
   ROTATE LEFT
   ROL 011 REG VAL
The ROL commands rotates the value in the designated register a certain amount of steps to the left.
   REG: 2 bits
   VAL: 3 bits
   MOVE
   MOV: 1000 REG REG
The move commands copies the value of one register to another. The first designated register is the target register.
   REG: 2 bits
   AND
   AND 1001 REG REG
The command performs an arithmetic AND between two designated registers and puts the result in register A.
   REG: 2 bits
   TEST
   TEST 1001 11 REG
The command inspects a register, and depending on its contents executes either the next command (CMDA) or the command after that (CMDB). The first command (CMDA) is executed if the inspected register has a non-zero value. The second command (CMDB) is executed if the inspected register had a zero value. The test command cannot be nested without leveraging jumps as helper operations.
   REG: 2 bits
   OR
   OR 1010 REG REG
The command performs an arithmetic OR between two designated registers and puts the result in register A.
   REG: 2 bits
   SHIFT LEFT
   SHL 1010 11 REG
The command performs a left shift (by one bit) of the indicated register, filling the rightmost bit with a '0'.
   REG: 2 bits
   XOR
   XOR 1100 REG REG
The command performs an arithmetic XOR between two designated registers and puts the result in register A.
   SHIFT RIGHT
   SHR 1100 11 REG
   REG: 2 bits
The command performs a right shift (by one bit) of the indicated register, filling the leftmost bit with a '0'.
   REG: 2 bits
   ADD
   ADD 1101 REG REG
The command performs an addition between two designated registers and puts the result in register A. There is no carry bit support, so overflow needs to be handled in software, if needed.
   REG: 2 bits
   FLIP nibbles
   FLIP 1101 11 REG HI <-> LO
This command flips the nibbles of the register—the highest 4 bits are placed in the lower 4, and vice versa. The result is applied to the register itself.
   REG: 2 bits
   SUBTRACT/DIFFERENCE
   SUB 1110 REG REG
The command performs an subtraction between two designated registers and puts the result in register A. Since there is no support for negative values, the computation is actually the difference between the two values.
   REG: 2 bits
   NOT
   NOT 1110 11 REG
The command performs an arithmetic (bitwise) NOT for a designated register. It is the register itself that is modified.
   REG: 2 bits
   LESS THAN
   LT 1111 REG REG
The command performs an comparison between two designated registers and puts the result in register A. The result if 1, if the first register contains a smaller value than the second, otherwise the result is 0.
   REG: 2 bits
   NO OPERATION
   NOP 1111 11 00
The command performs no operation. Can be used as a filler e.g. for the TEST operation.
   END/TERMINATE
   END 1111 11 11
The command terminates the running of the code.

Memory bank: The memory consists of virtual banks of I/O memory and persistent memory. The current expectation is that the memory consists of 8 bytes (addressable by 3 bits). The main components of the memory are:

1. The Resource store: These two bytes are stored on behalf of the token in the resource for the lifetime of the individual token. Therefore these bytes can be used to maintain service state, if the token is controlling a service with more states than a simple "open". The resource store is always available for the token control program, and has a default value of 0x0000.

2. The Resource state: These are bits that represent the global state of the resource—and these are not token specific, at least in the normal case. The bits presented in the resource state are defined per resource manufacturer, and can represent whatever resource property. The resource state is readable only, and represents the state when the token program was initiated.

3. Resource Control: These are bits that can be used to control some resource specific properties, either as individual bits or as a commandvalue type interface. The contents of the bits is evaluated after the token program terminates. If some of the controlled properties are to be channeled back to the token program as knowledge, they should be represented in the resource state as readable bits.

The default value of the resource control bits is 0x0000, and the preferred way of operation is that only 1-bits signify a property change, or that the 2 bytes are used for individual commands to set state (in the latter case typically only one or two properties can be set during one program execution).

4. Delegation value: If the token is exercised as a delegated operation, the indexing of the token is provided as input. The first byte contains the level 1 and 2 diversification, and the second byte the level 3 div.

5. User input: For some transactions it is expected that the user can give an input in association with a token, to indicate some form of wish state about the operation to be carried out. The state will be encoded in 8 bits/1 byte, and will be added to the token system access protocol as an optional feature.

INP OUT
0|Resource store Resource store
1|Resource store Resource store
2|Resource state RFU
3|Resource state RFU
4|DelegationVal 1 RFU
5|DelegationVal2 RFU
6|UserInput Resource Control
7|RFU Resource Control Resource internal wiring: The assumption is that the Resource State and Resource Control bits are available and used when the virtual machine or execution environment code starts. However, the machine has no notion of time, neither is it logically interruptible. Therefore the I/O registers should be conceptually consistent as the code is run, i.e. the Resource Store, Resource State and possible User Input shall be available (potentially as copies) to the code when it starts, and only the values present in the Resource Store and Resource Control when the code terminates shall have any meaning. In some embodiments, the whole (prefilled) 8 bytes are a memory buffer available to the virtual machine when it starts, and on completion the Resource Store bytes are stored (commanded by libfsa) in association with the token identifier, and The Resource Control bytes are transported to a possible control unit in the resource.

Both Resource State and Resource Control data can be implemented e.g. as banks of GPIO to communicate with an external control unit. Alternatively these values can be formed from/conveyed as protocol data units, PDUs, over a transmission channel. The code engine itself does not dictate any preference in the mechanism of integration.

Example: Assuming that the resource has different log-in and log-out operations, that this control is encoded by two bits in the Resource control bytes (bit 3 for login, bit 2 for logout) and we would want the first "tap" by a token to execute log-in, and the second "tap" to execute log-out. The program in the token could e.g. look as follows:
0000 0000 LOADB (load resource store)
1001 0001 TEST
0010 0100 SETIMM HI (command close)
0010 1000 SETIMM HI (command open)
0001 1110 STO 6 (Set command to control)
0001 1000 STO 0 (Set command to store)
1111 1111 END The implication of this code is that at an extra cost of 7 bytes per token, this logic can be implemented in the token system library and the resource can be wired independently of actual access control logic. This is especially useful if general purpose access control engines are used, where the input and outputs essentially are GPIOs wired to the controller using the above memory map. Not only does it allow for business case variation, it allows for flexibility in hardware setup on the resource end. Say if a token is supposed to open one of a 1000 cupboards that are centrally wired, the resource control can be configured as a PDU indicating the cupboard number (say 11 NUM(14bits)), where the program in the token (for opening cupboard no 42) would be 6 bytes long:
0010 1100 SETIMM HI 1100
0001 1110 STO 3->MEM 6
0010 1100 SETIMM HI 0010 (0×2A)
0011 0010 SETIMM LO 1010
0001 1111 STO 3 ->MEM 7
11111111END It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing an offline token-based access control scheme with code execution.

ACRONYMS LIST

HMAC Hash-based message authentication code
LTE Long term evolution
NFC Near-field communication
PDU Protocol data unit
WCDMA Wideband code division multiple access
WiMAX Worldwide interoperability for microwave access
WLAN Wireless local area network

REFERENCE SIGNS LIST

Figure 5:
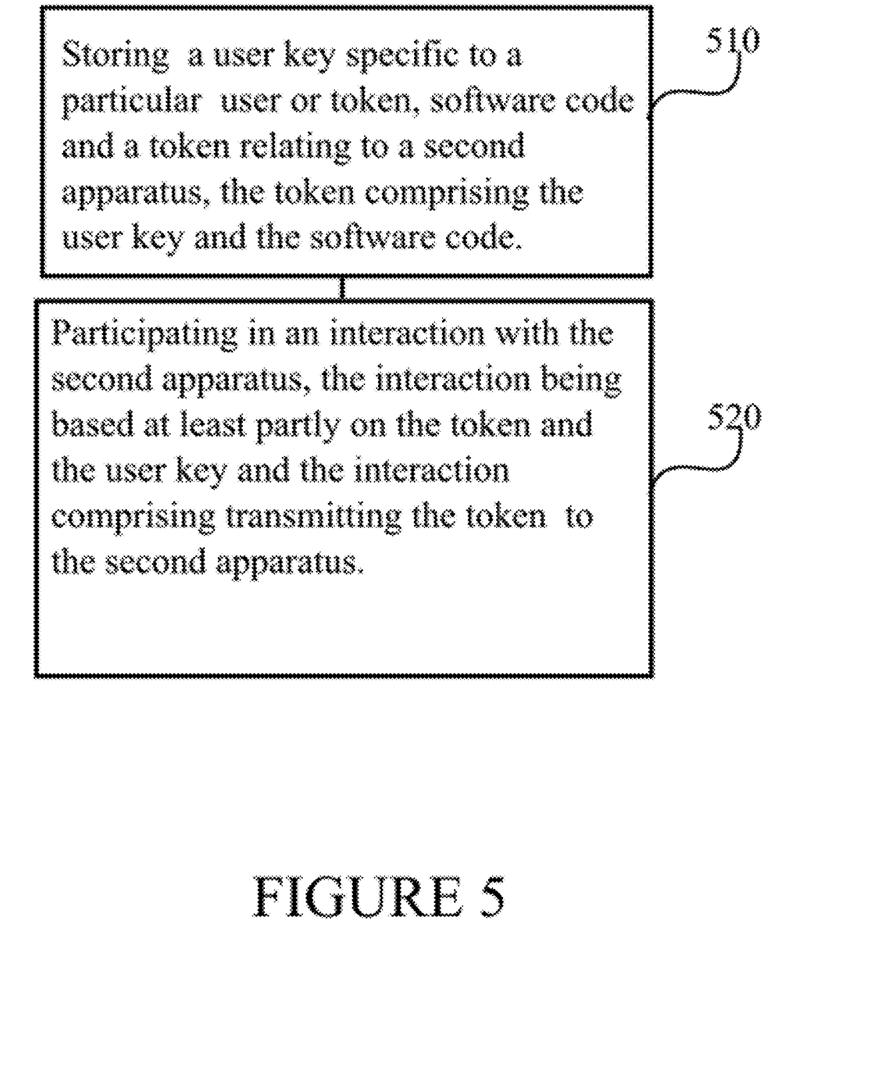
FIG. 5 a flow graph of a method in accordance with at least some embodiments of the present invention.
Figure 6:
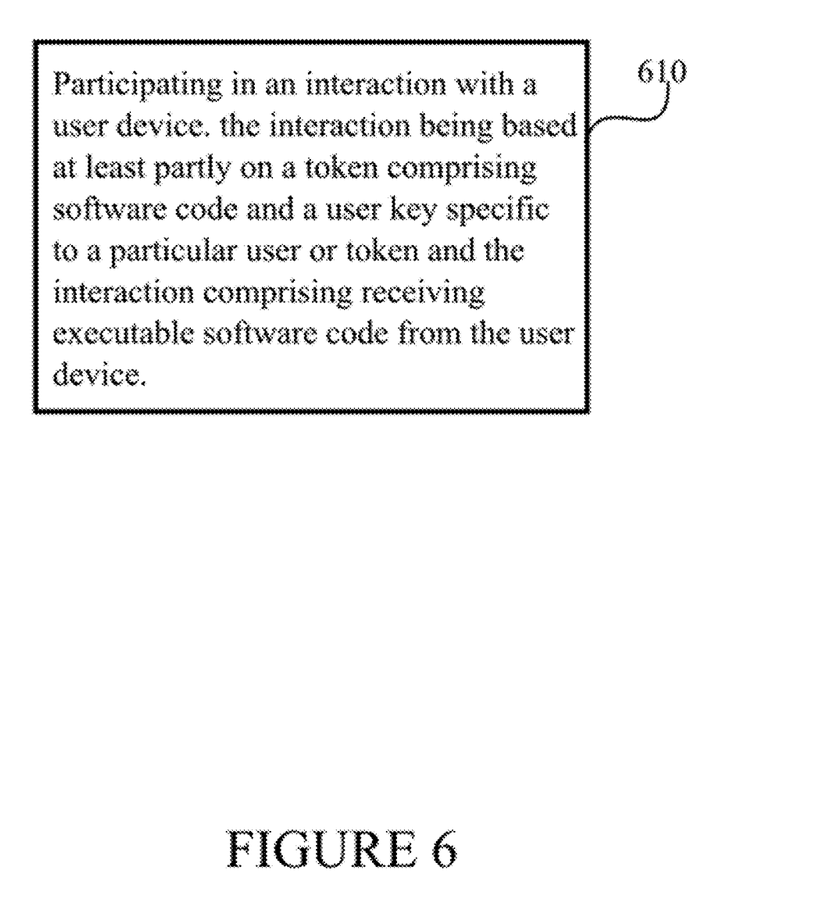
FIG. 6 is a flow graph of a method in accordance with at least some embodiments of the present invention.

| | |
|---|---|
| 110 | User device |
| 120 | Resource |
| 125 | Virtual machine |
| 130 | Base station |
| 140 | Server |
| 121 | Link |
| 131 | Cellular link |
| 134 | Network connection |
| 210 | Token |
| 220 | User key |
| 230 | Constraints |
| 240 | Delegation secret |
| 250 | Executable code |
| 300-370 | Structure of the device of FIG. 3 |
| 401 | Server interaction |
| 402 | Access interaction |
| 410-490 | Phases of signaling in FIG. 4 |
| 510-520 | Phases of the method of FIG. 5 |
| 610 | Phase of the method of FIG. 6 |

The invention claimed is:

1. An apparatus comprising a user device, the user device comprising:
a memory configured to store:
a user key specific to a particular user or token;
software code;
a token relating to a second apparatus, the token comprising the user key and the software code; and
at least one processing core configured to:
participate in an interaction with the second apparatus, the interaction being based at least partly on the token and the user key and the interaction comprising transmitting the token to the second apparatus,
wherein the software code is configured to:
when run on the second apparatus in a virtual machine, at least partly determine behaviour of the second apparatus in connection with the interaction, and
to be run in the virtual machine of the second apparatus, and wherein the software code comprises instructions for controlling behaviour of the second apparatus.

2. The apparatus according to claim 1, wherein the software code comprises instructions for controlling behaviour of the virtual machine.

3. The apparatus according to claim 1, wherein the token may be delegated by a user to another user.

4. The apparatus according to claim 1, wherein the software code comprises less than 20 bytes of memory.

5. The apparatus according to claim 1, wherein the software code is configured to control the virtual machine, the virtual machine comprising less than 1000 bytes of memory.

6. The apparatus according to claim 1, wherein the apparatus comprises a smart card.

7. An apparatus comprising:
a memory configured to store information, and
at least one processing core configured to:
participate in an interaction with a user device, the interaction being based at least partly on a token comprising software code and a user key specific to a particular user or token, and the interaction comprising receiving the token from the user device
wherein the apparatus is configured to run the software code on the least one processing core to at least partly determine behavior of the apparatus in connection with the interaction,
wherein the apparatus is configured to run the software code on the least one processing core in a virtual machine run on the at least one processing core, wherein the software code comprises instructions for controlling behaviour of the apparatus.

8. The apparatus according to claim 7, wherein the apparatus is configured to re-use the software code in a second access interaction with the user device or a second user device.

9. The apparatus according to claim 7, wherein the apparatus is configured to participate in the interaction in an offline state.

10. The apparatus according to claim 7, wherein the software code comprises instructions for controlling behaviour of the virtual machine.

11. The apparatus according to claim 10, wherein the software code is configured to control the virtual machine, the virtual machine comprising less than 1000 bytes of memory.

12. The apparatus according to claim 7, wherein the apparatus is configured to accept delegation of the token by a user to another user.

13. The apparatus according to claim 7, wherein the software code comprises less than 20 bytes of memory.

14. A non-transitory computer readable medium having stored thereon a set of computer readable instructions that, when executed by at least one processor, cause an apparatus comprising a user device to at least:
store a user key specific to a particular user or token, store software code, and store a token relating to a second apparatus, the token comprising the user key and the software code, and
participate in an interaction with the second apparatus, the interaction being based at least partly on the token and the user key and the interaction comprising transmitting the token to the second apparatus, wherein the software code configured to:
when run on the second apparatus in a virtual machine, at least partly determine behaviour of the second apparatus in connection with the interaction, and
to be run in the virtual machine of the second apparatus, and wherein the software code comprises instructions for controlling behaviour of the second apparatus.

* * * * *